United States Patent
Osawa et al.

(10) Patent No.: US 12,480,616 B2
(45) Date of Patent: Nov. 25, 2025

(54) GAS COMPRESSOR, AUXILIARY STORAGE UNIT, AND GAS COMPRESSION SYSTEM

(71) Applicant: MAX CO., LTD., Tokyo (JP)

(72) Inventors: Takuya Osawa, Tokyo (JP); Yuuki Ueda, Tokyo (JP)

(73) Assignee: Max Co., Ltd., Tokyo (JP)

(*) Notice: Subject to any disclaimer, the term of this patent is extended or adjusted under 35 U.S.C. 154(b) by 77 days.

(21) Appl. No.: 18/138,889

(22) Filed: Apr. 25, 2023

(65) Prior Publication Data

US 2023/0349508 A1 Nov. 2, 2023

(30) Foreign Application Priority Data

Apr. 28, 2022 (JP) ................. 2022-074675

(51) Int. Cl.
*F16M 11/24* (2006.01)
*F16F 15/04* (2006.01)
*F17C 9/00* (2006.01)

(52) U.S. Cl.
CPC ............ *F16M 11/24* (2013.01); *F16F 15/04* (2013.01); *F17C 9/00* (2013.01); *F16M 2200/08* (2013.01); *F17C 2201/0109* (2013.01); *F17C 2201/035* (2013.01); *F17C 2205/0134* (2013.01); *F17C 2205/018* (2013.01); *F17C 2221/031* (2013.01); *F17C 2227/0157* (2013.01)

(58) Field of Classification Search
CPC ..... F16F 15/04; F17C 9/00; F17C 2201/0109; F17C 2201/035; F17C 2205/0134; F17C 2205/018; F17C 2221/031; F17C 2227/0157; F16M 2200/08
See application file for complete search history.

(56) References Cited

U.S. PATENT DOCUMENTS

| 6,485,269 | B1 | 11/2002 | Matthew et al. |
| 7,261,274 | B2* | 8/2007 | Vatsaas ................. F16F 15/08 |
| | | | 248/573 |

(Continued)

FOREIGN PATENT DOCUMENTS

| EP | 3318757 A1 | 5/2018 |
| JP | 2012-159030 A | 8/2012 |

(Continued)

OTHER PUBLICATIONS

Jan. 8, 2024—(EP) Extended Search Report—EP App 23169829.1.

*Primary Examiner* — Connor J Tremarche
(74) *Attorney, Agent, or Firm* — Banner & Witcoff, Ltd.

(57) ABSTRACT

A gas compressor includes a main body portion having a compression unit configured to compress gas, a drive unit configured to drive the compression unit, and a storage part configured to store the gas compressed by the compression unit, a leg portion configured to support the main body portion and configured to be supported by a support portion provided on an auxiliary storage unit, and a fastening unit configured to detachably fasten the auxiliary storage unit and the main body portion. The leg portion includes a connecting buffer portion having elasticity and configured to be brought into contact with the support portion, and the fastening unit fastens the auxiliary storage unit by applying a force in a direction in which the first connecting buffer portion is elastically deformed.

18 Claims, 12 Drawing Sheets

(56) References Cited

U.S. PATENT DOCUMENTS

| | | | |
|---|---|---|---|
| 2005/0166921 A1* | 8/2005 | DeVries | F04C 29/061 |
| | | | 128/204.21 |
| 2008/0273994 A1 | 11/2008 | Sadkowski et al. | |
| 2016/0290329 A1* | 10/2016 | Hernandez | F04B 49/225 |
| 2018/0119687 A1* | 5/2018 | Asai | F04B 35/06 |

FOREIGN PATENT DOCUMENTS

| | | |
|---|---|---|
| JP | 2013-189897 A | 9/2013 |
| JP | 2018-071507 A | 5/2018 |
| WO | 2015/175844 A1 | 11/2015 |

\* cited by examiner

GAS COMPRESSOR, AUXILIARY STORAGE UNIT, AND GAS COMPRESSION SYSTEM

CROSS-REFERENCE TO RELATED APPLICATIONS

This application is based on Japanese Patent Application No. 2022-074675 filed on Apr. 28, 2022, the contents of which are incorporated herein by way of reference.

TECHNICAL FIELD

The present invention relates to a gas compressor that compresses and stores gas, an auxiliary storage unit to be connected to the gas compressor, and a gas compression system in which the gas compressor and the auxiliary storage unit are connected.

BACKGROUND ART

In a gas compressor called an air compressor, when an operation with a large air consumption amount is performed, an air amount (an amount of air) that can be stored may be insufficient only with a capacity of a tank provided in the air compressor. Therefore, an auxiliary tank is connected to the air compressor by a flexible pipe (hose) to increase the capacity of the tank, and the shortage of the air amount that can be stored is eliminated.

For such an auxiliary tank, there is a demand to integrate the auxiliary tank with the air compressor for ease of carrying and space saving, and an air compressor in which the air compressor and the auxiliary tank are integrated has been proposed (for example, see Patent Literature 1). Further, an air compressor in which an auxiliary tank is integrated by screw connection has been proposed (for example, see Patent Literature 2).
Patent Literature 1: JP2013-189897A
Patent Literature 2: JP2018-071507A In a configuration in which the auxiliary tank is integrated with the air compressor by screw connection, mechanical connection between the auxiliary tank and the air compressor is stabilized by tightening the screws by a predetermined amount. However, a driver is required to fasten the screws. Meanwhile, when the auxiliary tank is attached to the air compressor without using a tool such as a driver, it is difficult to stabilize the connection between the auxiliary tank and the air compressor.

The present invention has been made to solve the above problem, and an object of the invention is to provide a gas compressor in which an auxiliary storage unit is detachably attached to the gas compressor and mechanical connection between the auxiliary storage unit and the gas compressor may be stabilized, an auxiliary storage unit to be connected to the gas compressor, and a gas compression system in which the gas compressor and the auxiliary storage unit are connected.

SUMMARY OF INVENTION

According to an aspect of the invention, a gas compressor includes a main body portion having a compression unit configured to compress gas, a drive unit configured to drive the compression unit, and a storage part configured to store the gas compressed by the compression unit, a leg portion configured to support the main body portion at an installation place and configured to be supported by a support portion provided on an auxiliary storage unit, the auxiliary storage unit including an auxiliary storage part for storing the gas compressed by the compression unit and configured to supply the gas stored in the auxiliary storage part to the storage part, and a fastening unit configured to detachably fasten the auxiliary storage unit and the main body portion. The leg portion includes an elastic connecting buffer portion configured to be brought into contact with the support portion, and the fastening unit fastens the auxiliary storage unit by applying a force in a direction in which the first connecting buffer portion is elastically deformed.

In the present invention, the auxiliary storage unit is detachably fastened to the gas compressor by the fastening unit. The fastening unit fastens the auxiliary storage unit by applying a force in the direction that elastically deforms the connecting buffer portion, and thus a position of the gas compressor with respect to the auxiliary storage unit is stabilized by a reaction force of the connecting buffer portion.

According to another aspect of the invention, an auxiliary storage unit includes an auxiliary storage part configured to store gas compressed by a gas compressor, a support portion configured to support a leg portion of the gas compressor, and a fastening unit configured to detachably fasten the gas compressor in which the leg portion is supported by the support portion. The support portion is configured to be brought into contact with an elastic connecting buffer portion of the leg portion, and the fastening unit is configured to fasten the gas compressor by applying a force in a direction in which the elastic connecting buffer portion is elastically deformed.

In the present invention, the gas compressor is detachably fastened to the auxiliary storage unit by the fastening unit. The fastening unit fastens the gas compressor by applying a force in the direction that elastically deforms the connecting buffer portion, and thus the position of the gas compressor with respect to the auxiliary storage unit is stabilized by the reaction force of the connecting buffer portion.

According to another aspect of the invention, a gas compression system includes a gas compressor including a main body portion including a compression unit configured to compress gas, a drive unit configured to drive the compression unit, and a storage part configured to store the gas compressed by the compression unit, and a leg portion configured to support the main body portion at an installation place and configured to be supported by a support portion provided on an auxiliary storage unit, and an auxiliary storage unit including an auxiliary storage part for storing gas compressed by the gas compressor and detachably attached to the gas compressor, and a fastening unit configured to detachably fasten the gas compressor and the auxiliary storage unit and including an operation portion to be operated for the fastening and release the fastening in a state where the auxiliary storage unit is attached to the gas compressor. At least one of the leg portion and support portion includes an elastic connecting buffer portion, and the fastening unit fastens the gas compressor and the auxiliary storage unit by applying a force in a direction in which the elastic connecting buffer portion is elastically deformed.

In the present invention, the auxiliary storage unit is detachably fastened to the gas compressor by the fastening unit. The fastening unit fastens the auxiliary storage unit by applying a force in the direction that elastically deforms the connecting buffer portion, and thus a position of the gas compressor with respect to the auxiliary storage unit is stabilized by a reaction force of the connecting buffer portion.

Advantageous Effects of Invention

In the present invention, since the gas compressor and the auxiliary storage unit are detachably fastened by the fastening unit, the auxiliary storage unit may be easily attached and detached as necessary. Further, the fastening unit fastens the gas compressor and the auxiliary storage unit by applying a force in the direction that elastically deforms the connecting buffer portion, thus the position of the gas compressor with respect to the auxiliary storage unit may be stabilized by the reaction force of the connecting buffer portion, and mechanical connection between the auxiliary storage unit and the gas compressor may be stabilized.

DESCRIPTION OF EMBODIMENTS

Hereinafter, embodiments of an air compressor serving as a gas compressor, an auxiliary storage unit detachably attached to the air compressor, and an air compression system serving as a gas compression system in which the auxiliary storage unit is attached to the air compressor according to the present invention will be described with reference to the drawings.

Figure 1A:
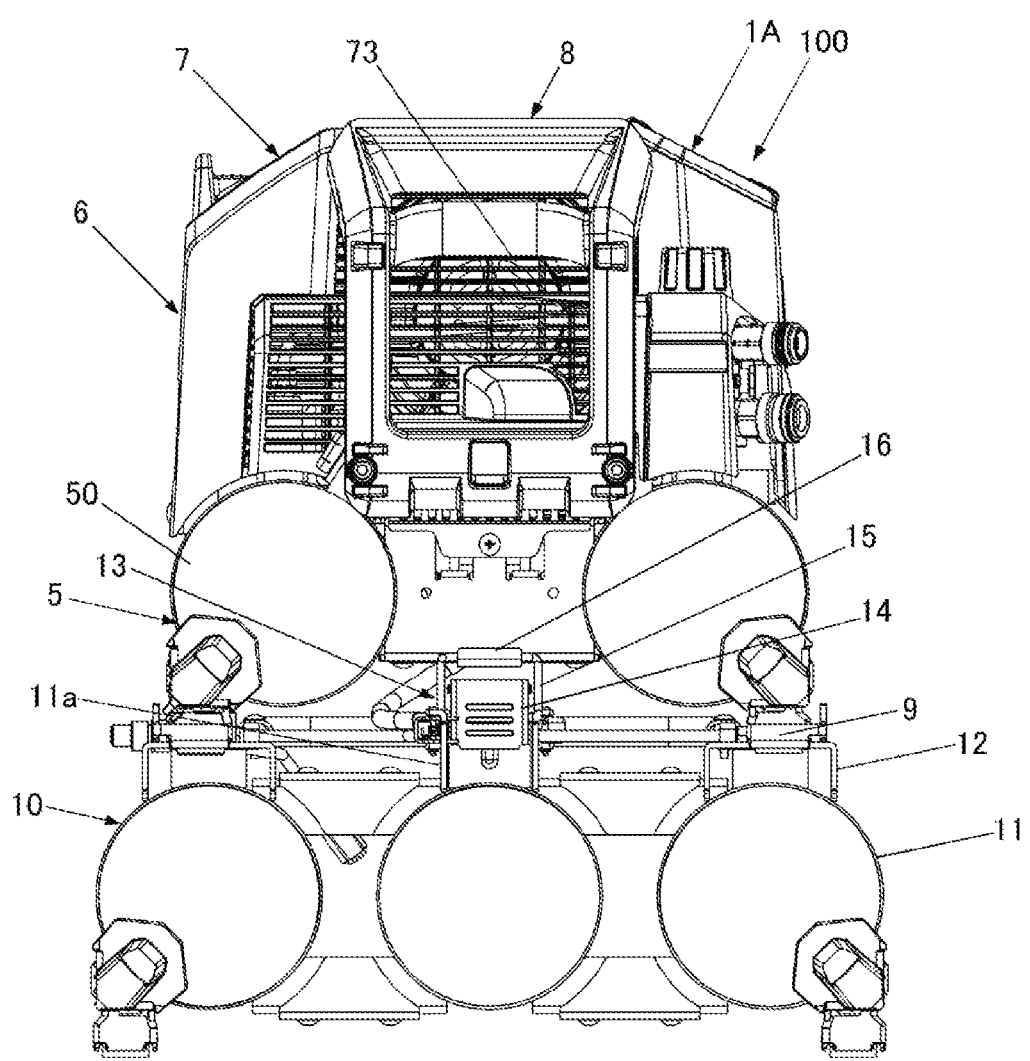
FIG. 1A is a front view showing an example of an air compression system of the present embodiment.
Figure 1B:
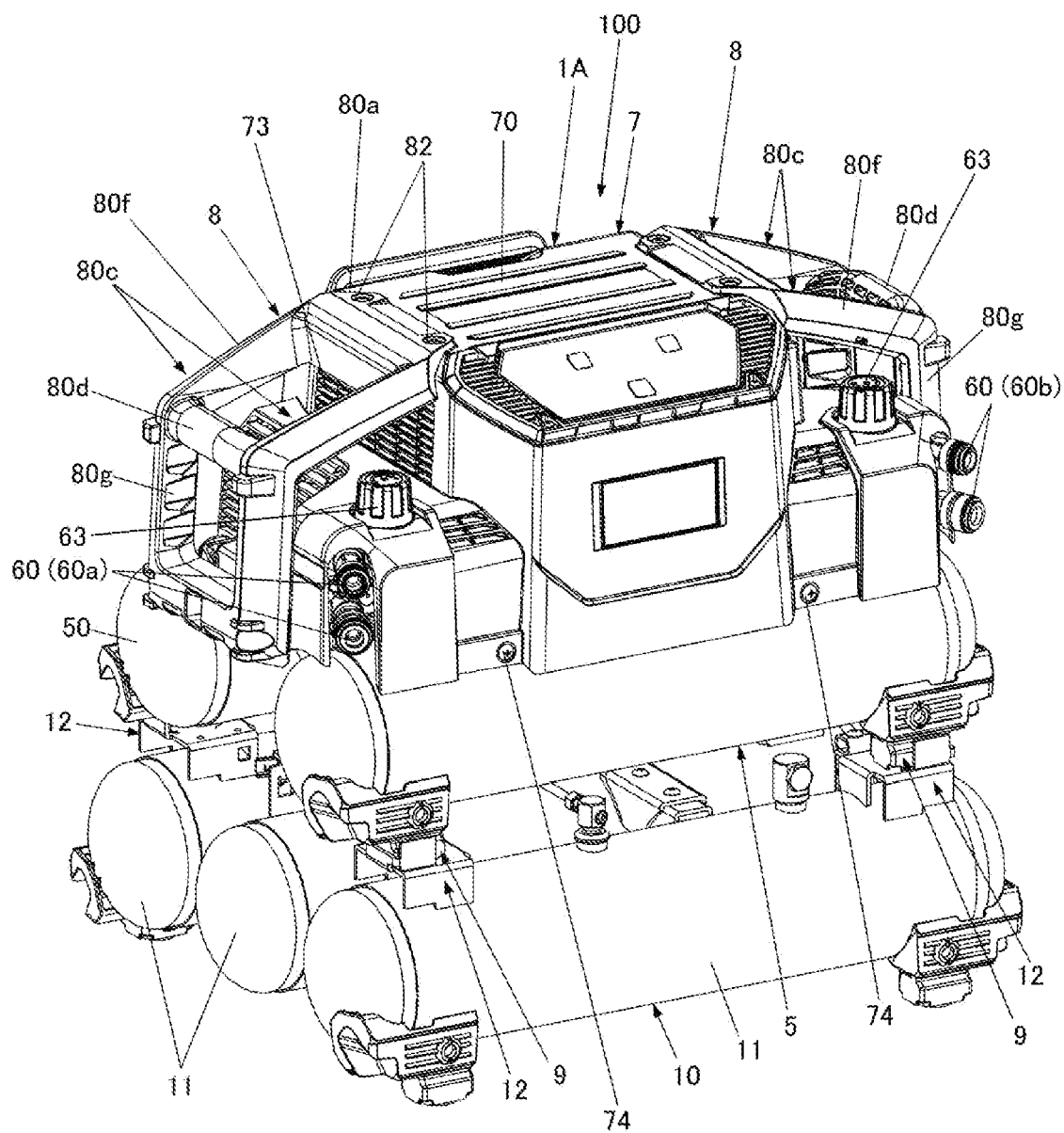
FIG. 1B is a perspective view showing the example of the air compression system of the present embodiment.
Figure 2:
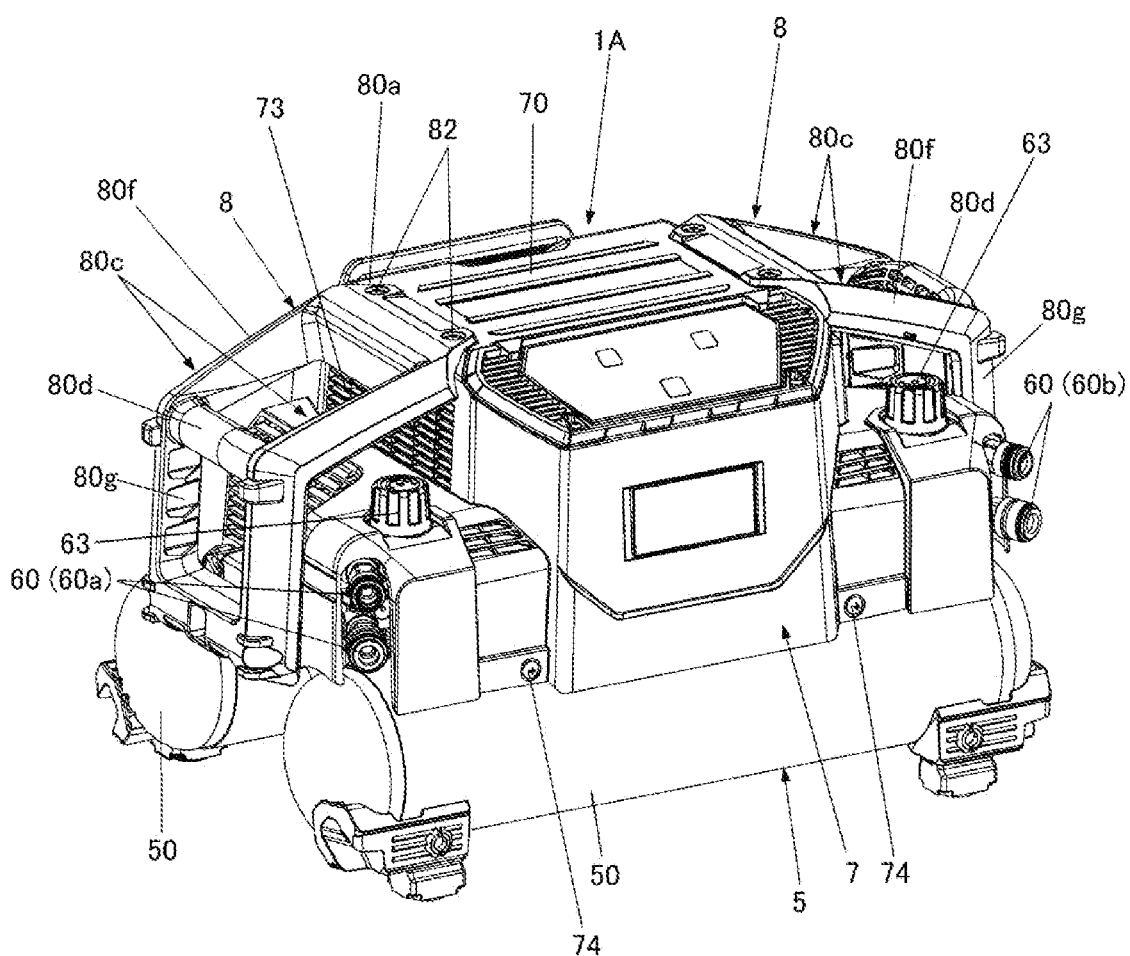
FIG. 2 is a perspective view showing an example of an air compressor of the present embodiment.
Figure 3:
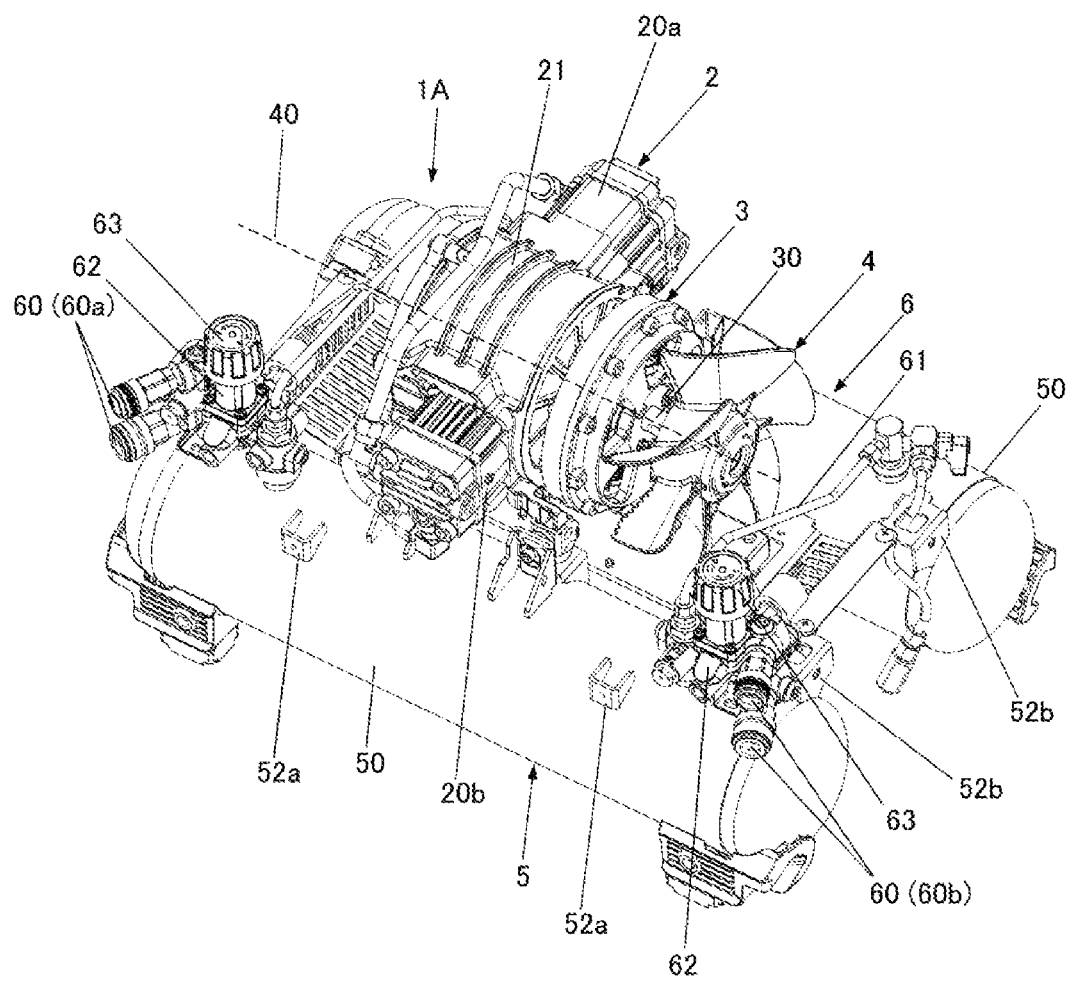
FIG. 3 is a perspective view showing an example of the air compressor of the present embodiment with a cover portion removed.
Figure 4:
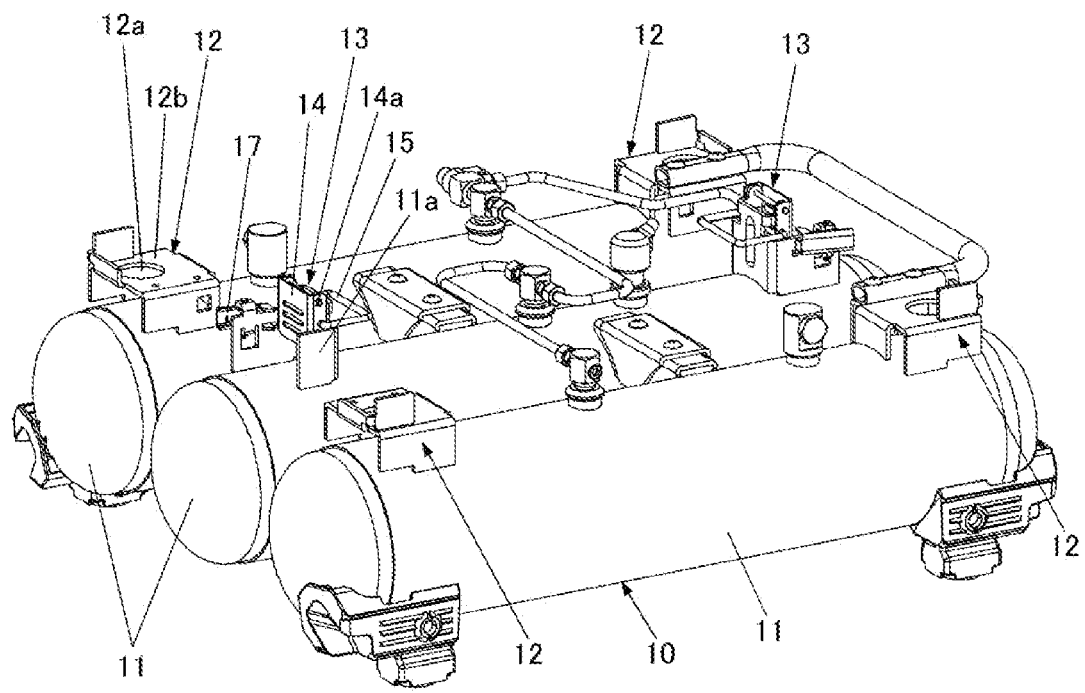
FIG. 4 is a perspective view showing an example of an auxiliary storage unit of the present embodiment.

Configuration Examples of Air Compressor, Auxiliary Storage Unit, and Air Compression System of Present Embodiment FIG. 1A is a front view showing an example of the air compression system of the present embodiment, and FIG. 1B is a perspective view showing the example of the air compression system of the present embodiment. Further, FIG. 2 is a perspective view showing an example of the air compressor of the present embodiment, FIG. 3 is a perspective view showing the example of the air compressor of the present embodiment with a cover portion removed, and FIG. 4 is a perspective view showing an example of the auxiliary storage unit of the present embodiment.

An air compression system 100 includes an air compressor 1A and an auxiliary storage unit 10 detachably attached to the air compressor 1A. An upper-lower direction of the air compressor 1A and the air compression system 100 in which the auxiliary storage unit 10 is attached to the air compressor 1A is determined in consideration of a usage mode in which the air compressor 1A and the air compression system 100 are installed at an installation place such as a ground or a floor of a building.

The air compressor 1A includes a compression unit 2 that compresses air serving as an example of gas, a drive unit 3 that drives the compression unit 2, an air blowing unit 4 that is driven by the drive unit 3 and generates a flow of air for cooling the compression unit 2 and the drive unit 3, and a storage part 5 that stores the air compressed by the compression unit 2 (compressed air).

The air compressor 1A includes a main body portion 6 in which the compression unit 2, the drive unit 3, the air blowing unit 4, and the storage part 5 are provided; a cover portion 7 that covers at least a part of the main body portion 6; and handle portions 8 that may be held by hands of a person.

The compression unit 2 includes a primary cylinder 20a and a secondary cylinder 20b. Each of the primary cylinder 20a and the secondary cylinder 20b includes a piston (not shown). In the compression unit 2, the pistons of the primary cylinder 20a and the secondary cylinder 20b are connected to a crankshaft (not shown) rotatably supported by a crankcase 21. In the compression unit 2, each piston reciprocates as the crankshaft rotates, and the compressed air is generated by the reciprocation of each piston. The compression unit 2 generates compressed air having a higher pressure by further compressing the air, which is compressed by the primary cylinder 20a, by the secondary cylinder 20b.

The drive unit 3 is a motor (electric motor) driven by electricity. One side (not shown) of a rotating shaft 30 of the drive unit 3 is connected to the crankshaft of the compression unit 2.

The air blowing unit 4 is implemented by an axial-flow fan and is attached to the other side of the shaft 30 of the drive unit 3. The air blowing unit 4 is driven by the drive unit 3 to rotate, thereby generating a flow of air from the air blowing unit 4 toward the drive unit 3 and the compression unit 2.

The storage part 5 includes a plurality of tanks 50 that store the compressed air. In the tank 50, a radial direction of a cylindrical shape is a lateral direction, and a direction orthogonal to the radial direction (lateral direction) is a longitudinal direction. The storage part 5 includes two tanks 50 in this example, and the two tanks 50 are arranged side by side in the radial direction such that the longitudinal directions of the tanks 50 are parallel to each other.

In the main body portion 6, the crankshaft (not shown) of the compression unit 2 is connected to the one side of the shaft 30 of the drive unit 3, and the air blowing unit 4 is attached to the other side of the shaft 30 of the drive unit 3. Accordingly, in the main body portion 6, a direction in which the shaft 30 of the drive unit 3 extends is a rotation axis direction 40 of the air blowing unit 4, and the compression unit 2, the drive unit 3, and the air blowing unit 4 are coaxially disposed along the rotation axis direction 40 of the air blowing unit 4.

In the main body portion 6, when the air blowing unit 4 is driven by the drive unit 3 to rotate, a flow of air from the air blowing unit 4 toward the drive unit 3 and the compression unit 2 is generated along the rotation axis direction 40 of the air blowing unit 4 indicated by a broken line in FIG. 3.

The main body portion 6 includes compressed air outlets 60 for supplying the compressed air stored in the tanks 50 in the storage part 5 to a tool (not shown). The compressed air outlet 60 is connected to the tanks 50 by a pipe 61. In this example, the air compressor 1A includes two compressed air outlets 60, that is, a compressed air outlet 60a for supplying high-pressure compressed air, and a compressed air outlet 60b for supplying relatively low-pressure compressed air. Each of the compressed air outlet 60a and the compressed air outlet 60b is provided with a pressure reducing valve 62 for supplying the compressed air decompressed to a desired pressure to the tool, and a dial 63 for adjusting the pressure.

The air compressor 1A includes a connection pipe (not shown) that is detachably connected to a pipe of the auxiliary storage unit 10, supplies the compressed air compressed by the compression unit 2 to the auxiliary storage unit 10, and receives the supply of the compressed air stored in the auxiliary storage unit 10. The connection pipe has flexibility and is detachably connected to the pipe (not shown) of the auxiliary storage unit 10 without using a tool.

The cover portion 7 has a shape that covers all of the compression unit 2, the drive unit 3, and the air blowing unit 4, and an upper portion of the storage part 5. The cover portion 7 is fixed to attachment portions 52a provided on a periphery of the tanks 50 of the storage part 5 by screws 74.

The cover portion 7 includes vent holes 73 on both sides facing each other in the rotation axis direction 40 of the air blowing unit 4 along the flow of air generated by driving the air blowing unit 4.

The handle portion 8 includes an upper end portion 80a fixed to an upper surface portion 70 of the cover portion 7, a lower end portion 80b fixed to the storage part 5 constituting the main body portion 6, two protection portions 80c connecting the upper end portion 80a and the lower end portion 80b and facing the vent hole, and a grip portion 80d that may be held by hands. The protection portion 80c includes an upper protection portion 80f facing an upper portion of the vent hole 73 and a lateral protection portion 80g facing the vent hole 73.

The upper end portion 80a of the handle portion 8 is fixed to one end side of the upper surface portion 70 of the cover portion 7 by screws 82. Further, the lower end portion 80b of the handle portion 8 is fixed to attachment portions 52b provided on one end side in the longitudinal direction of the tanks 50 in the storage part 5 by screws (not shown). The lower end portion 80b of the handle portion 8 may be fixed to the attachment portions 52b by screws (not shown) together with the cover portion 7.

When the handle portion 8 is attached to the cover portion 7 and the main body portion 6 (the storage part 5), the two protection portions 80c and the grip portion 80d cover a part of a front side of the vent hole 73 along the rotation axis direction 40 of the air blowing unit 4. In the protection portion 80c, the upper protection portion 80f faces the upper portion of the vent hole 73, and the lateral protection portion 80g faces the vent hole 73. Accordingly, the handle portion 8 protects the vent hole 73 by preventing an object from hitting the vent hole 73 from a lateral side and from above.

The upper end portions 80a of the handle portions 8 are connected via the upper surface portion 70 of the cover portion 7. Accordingly, the strength of the pair of handle portions 8 provided to face each other in the rotation axis direction 40 of the air blowing unit 4 may be ensured. Further, since the handle portions 8 are fixed to the upper surface portion 70 of the cover portion 7, the rigidity of the cover portion 7 is increased, and damage due to deformation of the cover portion 7 may be reduced.

Figure 5A:
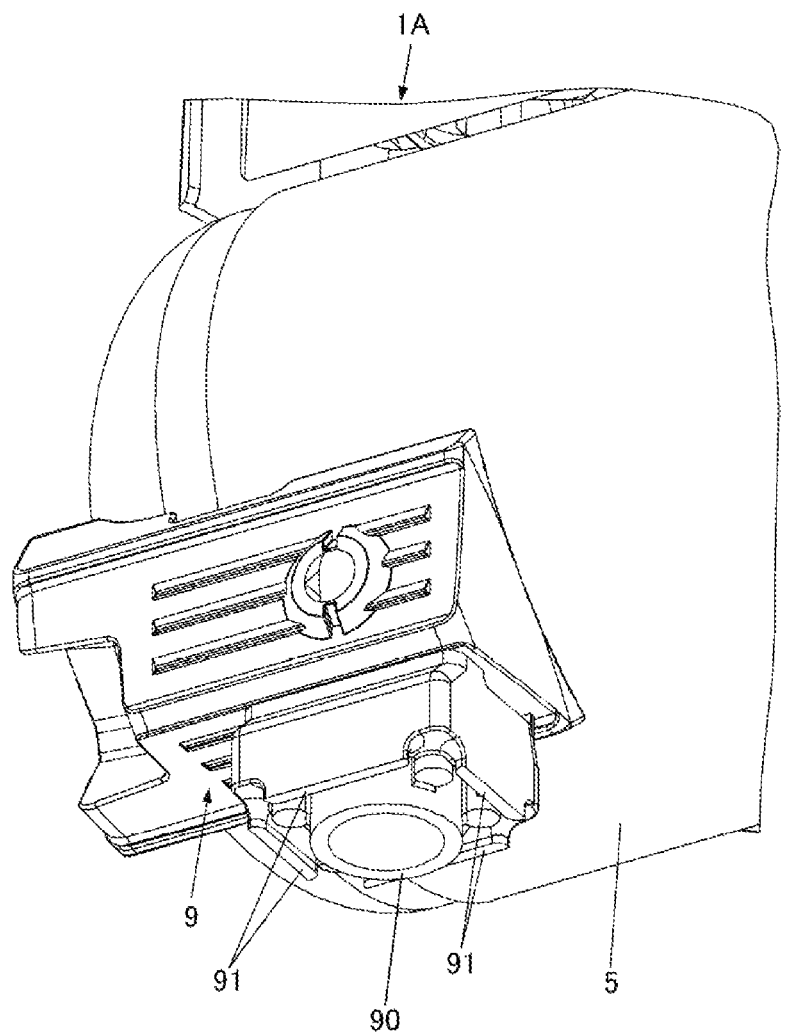
FIG. 5A is a perspective view showing an example of a leg portion of the present embodiment.
Figure 5B:
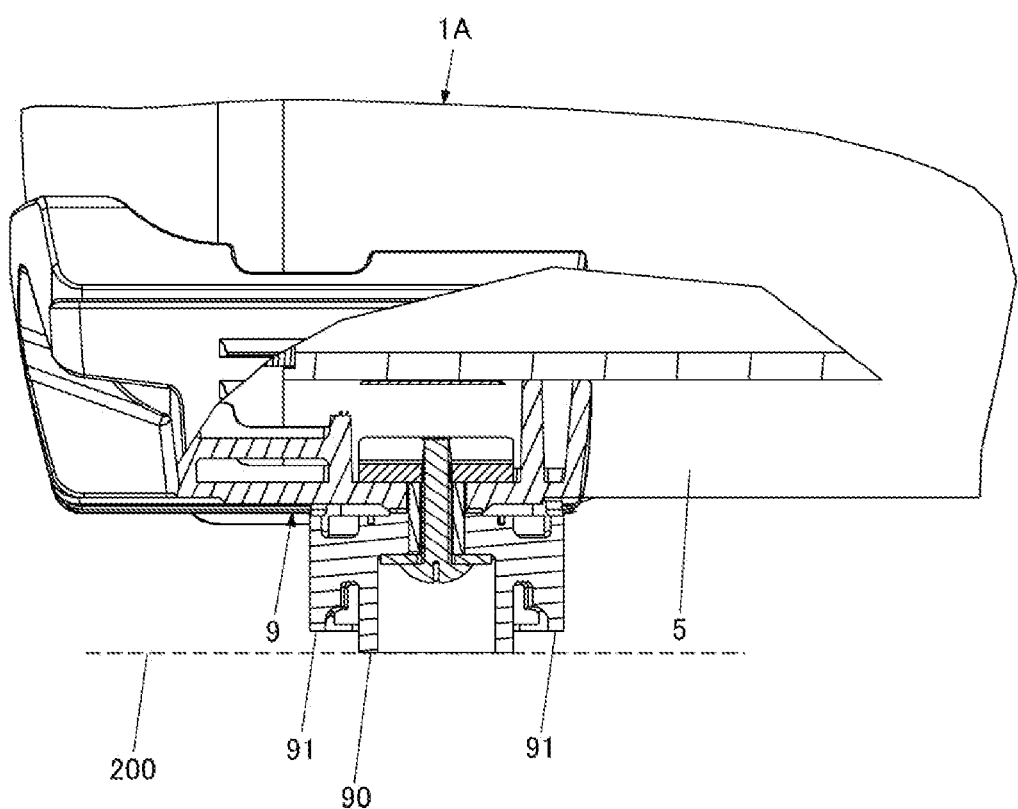
FIG. 5B is a side cross-sectional view showing the example of the leg portion of the present embodiment.

FIG. 5A is a perspective view showing an example of a leg portion of the present embodiment provided in the air compressor, and FIG. 5B is a side cross-sectional view showing the example of the leg portion of the present embodiment.

The air compressor 1A includes leg portions 9 having a function of supporting the air compressor 1A in contact with an installation place such as a ground or a floor of a building and a function of supporting the air compressor 1A with respect to the auxiliary storage unit 10.

The leg portions 9 are provided on lower surfaces of the two tanks 50. In this example, the leg portions 9 are provided on both end sides of each tank 50 in the longitudinal direction. Accordingly, the air compressor 1A is provided with the leg portions 9 at a total of four positions on the lower surfaces.

The leg portion 9 includes a grounding buffer portion 90 and connecting buffer portions 91. The grounding buffer portion 90 is formed of an elastic body such as rubber, and is provided to protrude from a lower surface (bottom surface) of the leg portion 9. The grounding buffer portion 90 has, for example, a cylindrical shape having a predetermined diameter. When the air compressor 1A is placed at the installation place 200, an axial end surface of the cylindrical grounding buffer portion 90 of each leg portion 9 is in contact with the installation place 200.

The connecting buffer portions 91 are each formed of an elastic body and are provided around the grounding buffer portion 90. The connecting buffer portions 91 are four sides into which the grounding buffer portion 90 is placed, for example. The connecting buffer portions 91 may be three or less sides or five or more sides into which the grounding buffer portion 90 is placed, or a columnar protrusion may be provided around the grounding buffer portion 90. The connecting buffer portions 91 may be formed integrally with the grounding buffer portion 90 or may be formed separately from the grounding buffer portion 90. The connecting buffer portions 91 are configured such that a protruding height from the bottom surface of the leg portion 9 is smaller than that of the grounding buffer portion 90, and are not in contact with the installation place 200 when the air compressor 1A is placed at the installation place 200.

Next, the auxiliary storage unit 10 detachably attached to the air compressor 1A will be described. The auxiliary storage unit 10 includes a plurality of tanks 11 that store compressed air. The tank 11 is an example of an auxiliary storage part, and a radial direction of a cylindrical shape is a lateral direction, and a direction orthogonal to the radial direction (lateral direction) is a longitudinal direction. The auxiliary storage unit 10 includes three tanks 11 in this example, and the three tanks 11 are arranged side by side in the radial direction such that the longitudinal directions of the tanks 11 are parallel to each other.

Figure 6A:
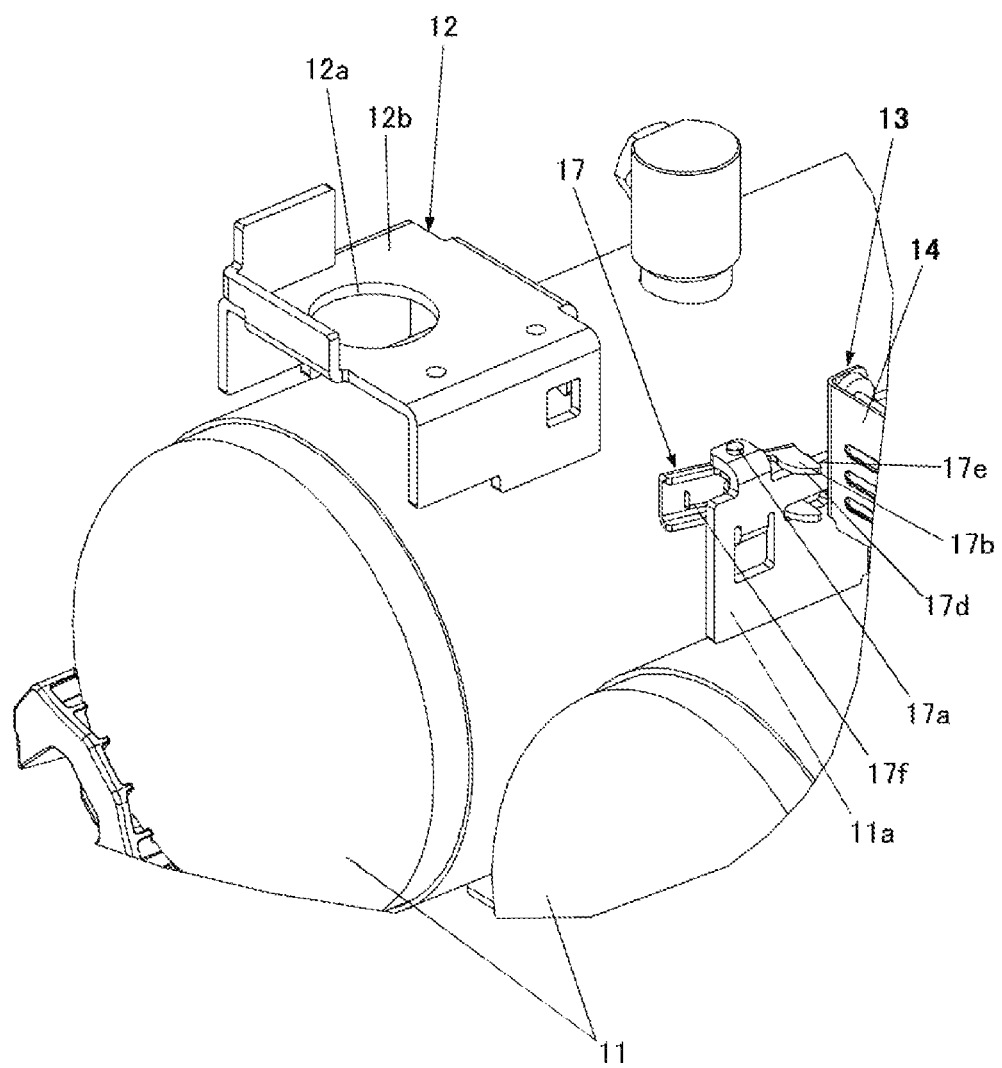
FIG. 6A is a perspective view showing an example of a support portion of the present embodiment.
Figure 6B:
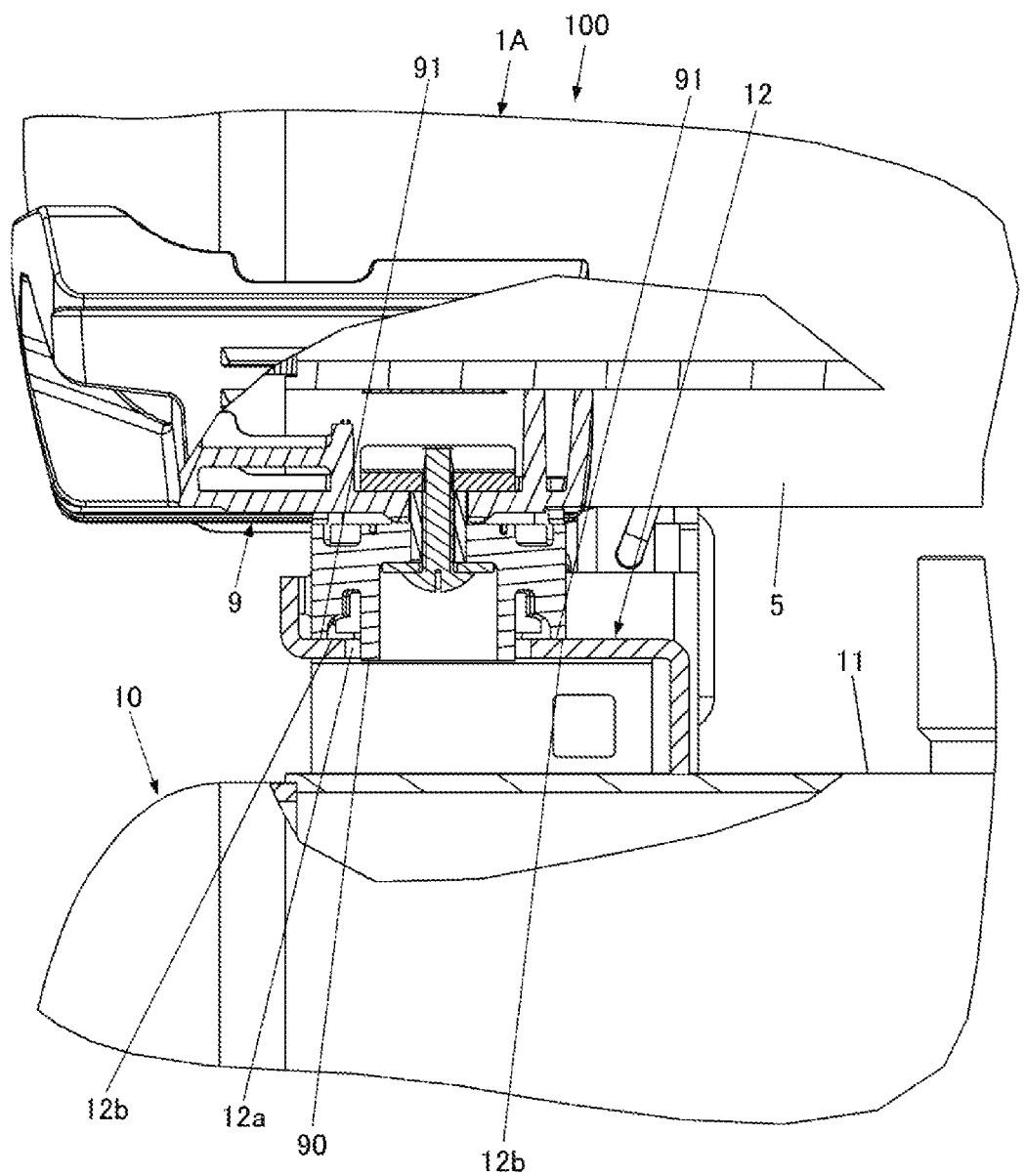
FIG. 6B is a side cross-sectional view showing the example of the support portion of the present embodiment.

FIG. 6A is a perspective view showing an example of a support portion of the present embodiment provided in the auxiliary storage unit, and FIG. 6B is a side cross-sectional view showing the example of the support portion of the present embodiment.

The auxiliary storage unit 10 includes support portions 12 that support the leg portions 9 of the air compressor 1A. The support portions 12 are provided on upper surfaces of two tanks 11 located on outer sides among the three tanks 11 arranged in parallel according to the arrangement of the leg portions 9 of the air compressor 1A. The support portion 12 includes an escape portion 12a for the grounding buffer portion 90 provided in the leg portion 9 of the air compressor 1A to enter, and a connecting support portion 12b to be brought into contact with the connecting buffer portion 91.

In the support portion 12, the escape portion 12a is formed by opening a hole, having a size into which the grounding buffer portion 90 may be inserted, in a part of the connecting support portion 12b having a flat surface. When the air compressor 1A is placed on the auxiliary storage unit 10 and the leg portion 9 is placed on the support portion 12, the connecting buffer portions 91 come into contact with the connecting support portion 12b, the grounding buffer portion 90 enters the escape portion 12a, and the grounding buffer portion 90 is not in contact with the connecting support portion 12b. Accordingly, when the leg portion 9 is supported by the support portion 12, only the connecting buffer portions 91 are in contact with the connecting support portion 12b. The support portion 12 may include the connecting buffer portion 91. Further, when the leg portion 9 is supported by the support portion 12, the connecting buffer portion 91 and the grounding buffer portion 90 may be in contact with the support portion 12, an amount of deformation in which the connecting buffer portion 91 is elastically deformed in a direction of gravity may be larger than an amount of deformation in which the grounding buffer portion 90 is elastically deformed in the direction of gravity, and the air compressor 1A is supported by the auxiliary storage unit 10 mainly by elastic deformation of the connecting buffer portion 91.

Figure 7A:
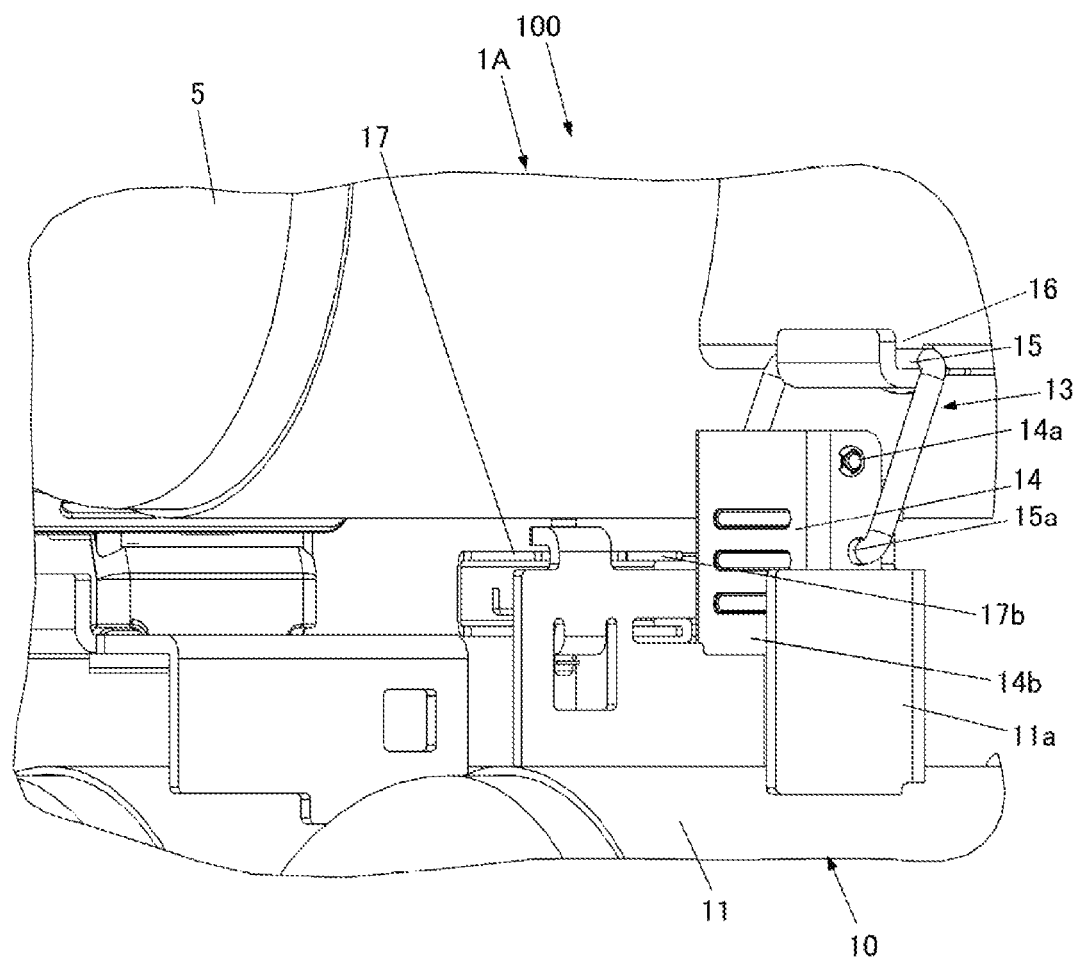
FIG. 7A is a perspective view showing an example of a fastening unit of the present embodiment.
Figure 7B:
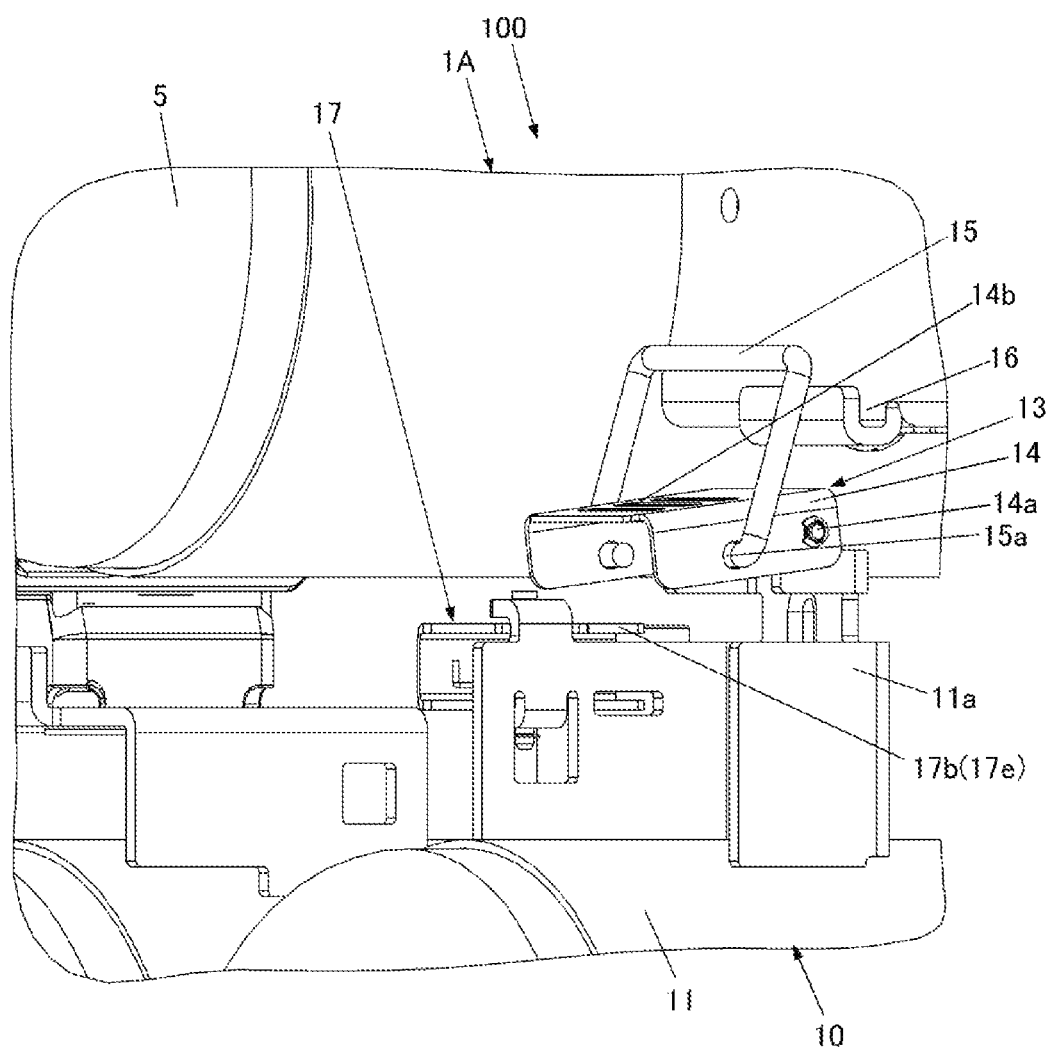
FIG. 7B is a perspective view showing the example of the fastening unit of the present embodiment.

FIGS. 7A and 7B are perspective views showing an example of a fastening unit of the present embodiment that fastens the air compressor and the auxiliary storage unit.

fastening units 13 that fasten the air compressor 1A and the auxiliary storage unit 10 together are provided. The fastening unit 13 is configured as a snap lock, and includes, on the auxiliary storage unit 10, a lever portion 14 that pivots around a shaft 14a, and an engagement portion 15 that is attached to the lever portion 14 rotatably around a shaft 15a. Further, the fastening unit 13 includes, on the air compressor 1A, an engaged portion 16 with which the engagement portion 15 attached to the lever portion 14 is engaged. The lever portion 14 and the engagement portion 15 may be provided on the air compressor 1A, and the engaged portion 16 may be provided on the auxiliary storage unit 10.

In the fastening units 13, the lever portions 14 are attached to the upper surface of the tank 11 positioned in the center among the three tanks 11 arranged in parallel in the auxiliary storage unit 10 and on both end sides in a direction in which the tank 11 extends.

The lever portion 14 is supported by an attachment portion 11a provided on an upper surface of a predetermined tank 11 of the auxiliary storage unit 10 such that one end side thereof is rotatable around the shaft 14a. The lever portion 14 may be supported such that the shaft 14a is rotatable with respect to the auxiliary storage unit 10, or may be supported such that the lever portion 14 is rotatable with respect to the shaft 14a. Further, the lever portion 14 includes, on the other end side, an operation portion 14b for receiving an operation of a person. The lever portion 14 is rotated around shaft 14a by an operation on the operation portion 14b.

The engagement portion 15 is supported between the shaft 14a and the operation portion 14b of the lever portion 14 rotatably around the shaft 15a. The engagement portion 15 may be supported such that the shaft 15a is rotatable with respect to the lever portion 14, or may be supported such that the engagement portion 15 is rotatable with respect to the shaft 15a. The shaft 14a of the lever portion 14 and the shaft 15a of the engagement portion 15 are parallel to each other.

In the engagement portion 15, a movement path of the shaft 15a supported by the lever portion 14 is a trajectory along an arc centered on the shaft 14a of the lever portion 14, and the engagement portion 15 moves in an upper-lower direction. Accordingly, when the lever portion 14 rotates around the shaft 14a, the engagement portion 15 is moved in the upper-lower direction.

In the fastening unit 13, the engaged portion 16 is attached between the two tanks 50 of the storage part 5 and on both end sides along the direction in which the tanks 50 extend.

The engaged portion 16 is formed in a shape in which an upper side thereof is opened and the engagement portion 15 may be engaged therewith. The engaged portion 16 is provided at a position where the engagement portion 15 may be engaged therewith when the air compressor 1A is placed on the auxiliary storage unit 10 and the support portion 12 of the auxiliary storage unit 10 and the leg portion 9 of the air compressor 1A are aligned.

As shown in FIG. 7A, in the lever portion 14, at a connection position where the engagement portion 15 is engaged with the engaged portion 16, and the air compressor 1A and the auxiliary storage unit 10 are connected to each other, the shaft 15a of the engagement portion 15 is located below the shaft 14a of the lever portion 14, and the shaft 14a and the shaft 15a are aligned in a vertical direction. On the other hand, in the lever portion 14, as shown in FIG. 7B, in a release position where the connection between the air compressor 1A and the auxiliary storage unit 10 is released, the shaft 15a of the engagement portion 15 moves upward due to a rotation operation of the lever portion 14 around the shaft 14a, and the engagement portion 15 is disengaged from the engaged portion 16.

Figure 8:
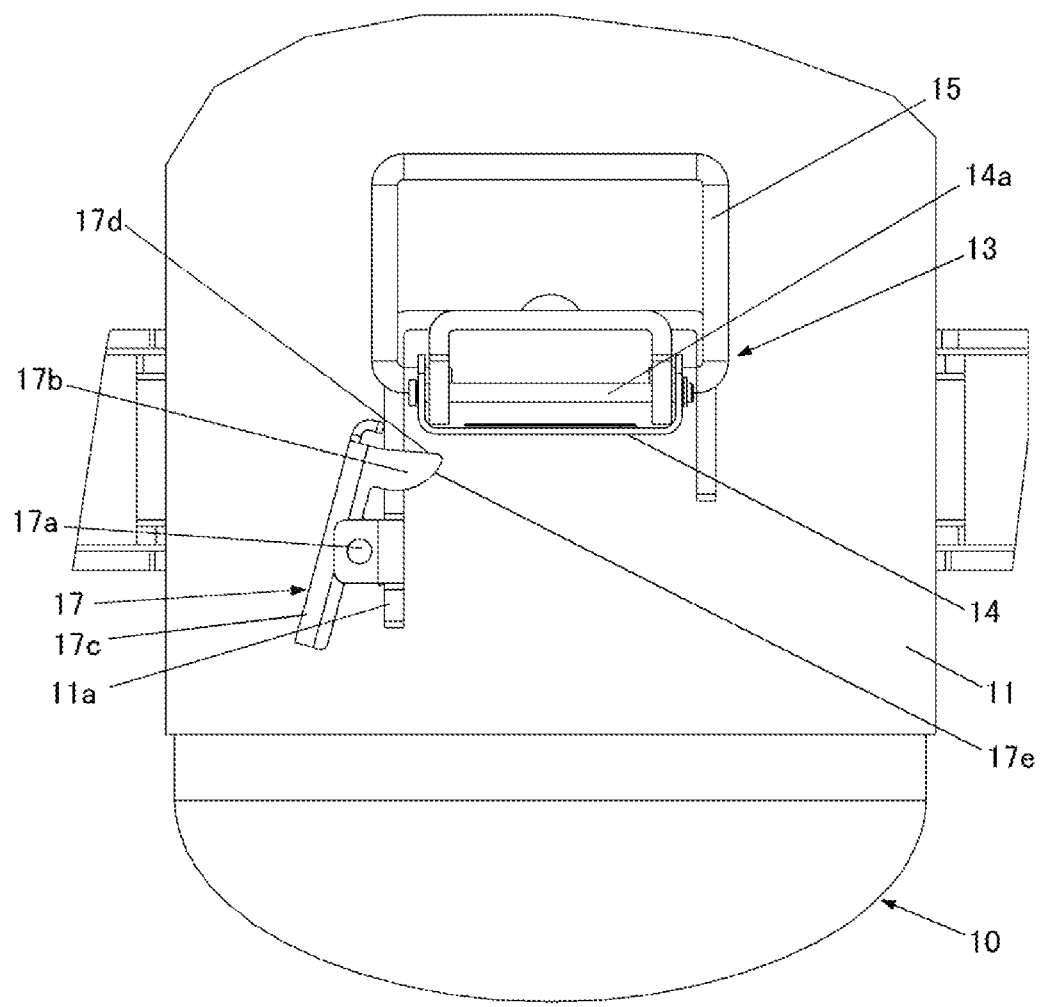
FIG. 8 is a plan view showing an example of a holding portion of the present embodiment.

FIG. 8 is a plan view showing an example of a holding portion of the present embodiment that holds the fastening unit at the connection position. The fastening unit 13 includes a holding portion 17 that holds the lever portion 14 at the connection position.

The holding portion 17 is supported by the attachment portion 11a provided on the upper surface of the predetermined tank 11 of the auxiliary storage unit 10 rotatably around a shaft 17a. The holding portion 17 includes a function projection portion 17b on one end side with the shaft 17a interposed therebetween, and an operation portion 17c for receiving an operation on the other end side.

The holding portion 17 moves, due to a rotation operation around the shaft 17a, between a restriction position where the function projection portion 17b protrudes to the movement path of the lever portion 14 and may restrict the movement of the lever portion 14 and a retreat position where the function projection portion 17b is retreated outside the movement path of the lever portion 14 and allows the movement of the lever portion 14.

In the function projection portion 17b, a restriction portion 17d is formed on a surface facing the lever portion 14 moved to the connection position, in a state where the holding portion 17 is moved to the restriction position. The restriction portion 17d is provided with a surface having a predetermined shape that prevents generation of a force in a direction that moves the holding portion 17 from the restriction position to the retreat position, when the lever portion 14 that attempts to move from the connection position to the release position comes into contact with the restriction portion 17d.

In the function projection portion 17b, a guiding portion 17e is formed on a surface facing the lever portion 14 moved to the release position, in a state where the holding portion 17 is moved to the restriction position. The guiding portion 17e is provided with an inclined surface or the like of a predetermined shape that generates a force in a direction that moves the holding portion 17 from the restriction position to the retreat position, when the lever portion 14 that attempts to move from the release position to the connection position comes into contact with the guiding portion 17e.

The holding portion 17 is biased by a biasing member 17f such as a torsion coil spring in a direction that rotates the holding portion 17 around the shaft 17a to the restriction position in which the function projection portion 17b protrudes to the movement path of the lever portion 14.

When holding portion 17 is moved to the restriction position due to the rotation operation around the shaft 17a by being biased by the biasing member 17f, the function projection portion 17b protrudes to the movement path of the lever portion 14 and holds the lever portion 14 at the connection position. When the holding portion 17 is moved to the retreat position due to the rotation operation around the shaft 17a by operating the operation portion 17c, the function projection portion 17b is retreated from the movement path of the lever portion 14 and allows the lever portion 14 to move from the connection position. Further, in the holding portion 17, when the lever portion 14 that attempts to move from the release position to the connection position comes into contact with the guiding portion 17e, a force in a direction that moves the holding portion 17 from the restriction position to the retreat position is generated, and the holding portion 17 is moved to the retreat position by the rotation operation around the shaft 17a, so that the function projection portion 17b is retreated from the movement path of the lever portion 14 and allows the movement of the lever portion from the release position to the connection position.

Usage Examples of Air Compressor, Auxiliary Storage Unit, and Air Compression System of Present Embodiment Next, usage examples of the air compressor 1A, the auxiliary storage unit 10, and the air compression system 100 will be described.

When the air compressor 1A is used alone without attaching the auxiliary storage unit 10 to the air compressor 1A, the air compressor 1A is used at the installation place 200 such as the ground or a floor of a building. When the air compressor 1A is placed at the installation place 200, an axial end surface of the cylindrical grounding buffer portion 90 of each leg portion 9 is in contact with the installation place 200.

Meanwhile, the connecting buffer portions 91 of each leg portion 9 are configured such that the protruding height from the bottom surface of the leg portion 9 is smaller than that of the grounding buffer portion 90, and are not in contact with the installation place 200 when the air compressor 1A is placed at the installation place 200. Accordingly, when the air compressor 1A alone is placed at the installation place 200, a weight of the air compressor 1A is supported by the grounding buffer portion 90 and is not applied to the connecting buffer portions 91. Accordingly, deterioration of the connecting buffer portions 91 used for connection of the auxiliary storage unit 10 is prevented.

Next, an operation of attaching and detaching the auxiliary storage unit 10 to and from the air compressor 1A will be described. When the auxiliary storage unit 10 is attached to the air compressor 1A, the air compressor 1A is placed on the auxiliary storage unit 10, and the leg portion 9 is placed on the support portion 12.

When the leg portion 9 of the air compressor 1A is placed on the support portion 12 of the auxiliary storage unit 10, the connecting buffer portions 91 are in contact with the connecting support portion 12b, the grounding buffer portion 90 enters the escape portion 12a, and the grounding buffer portion 90 is not in contact with the connecting support portion 12b. Accordingly, even if an amount of protrusion of the grounding buffer portion 90 from the bottom surface of the leg portion 9 changes (decreases) due to deterioration or the like of the grounding buffer portion 90, the connecting buffer portion 91 of the leg portion 9 provided in the air compressor 1A is reliably in contact with the connecting support portion 12b of the support portion 12 provided in the auxiliary storage unit 10.

When the leg portion 9 of the air compressor 1A is placed on the support portion 12 of the auxiliary storage unit 10, the grounding buffer portion 90 enters the escape portion 12a, and thus the air compressor 1A and the auxiliary storage unit 10 are aligned.

In order to fasten the air compressor 1A and the auxiliary storage unit 10 by the fastening units 13, the lever portion 14 is set to the release position, the engagement portion 15 is moved upward, the position of the engagement portion 15 is aligned with the engaged portion 16, and the engagement portion 15 is engaged with the engaged portion 16.

When the engagement portion 15 is engaged with the engaged portion 16 and the lever portion 14 is rotated in a direction that moves the lever portion 14 from the release position to the connection position by the operation on the operation portion 14b, the lever portion 14 comes into contact with the guiding portion 17e of the holding portion 17 moved to the restriction position in which the function projection portion 17b protrudes to the movement path of the lever portion 14.

When the lever portion 14 that attempts to move from the release position to the connection position comes into contact with the guiding portion 17e, the force is generated in a direction that moves the holding portion 17 from the restriction position to the retreat position. Accordingly, the holding portion 17 biased toward the restriction position by the biasing member 17f is moved to the retreat position against the biasing force by the rotation operation around the shaft 17a without being directly operated. Accordingly, the function projection portion 17b of the holding portion 17 retreats from the movement path of the lever portion 14, and the lever portion 14 moves from the release position to the connection position beyond the function projection portion 17b.

When the lever portion 14 moves to the connection position beyond the function projection portion 17b, the holding portion 17 moves from the retreat position to the restriction position due to the rotation operation around the shaft 17a by being biased by the biasing member 17f. Accordingly, the holding portion 17 holds the lever portion 14 at the connection position with the function projection portion 17b protruding to the movement path of the lever portion 14. Accordingly, the lever portion 14 may be moved from the release position to the connection position and the engagement portion 15 may be engaged with the engaged portion 16 without using a tool such as a driver, and at the same time, the lever portion 14 may be held at the connection position and the engagement portion 15 may be prevented from being unintentionally disengaged from the engaged portion 16.

Further, by connecting the connection pipe of the air compressor 1A to the pipe of the auxiliary storage unit 10, the air compression system 100 which may supply the compressed air stored in the auxiliary storage unit 10 while storing the compressed air compressed by the compression unit 2 into the auxiliary storage unit 10 is formed.

When the lever portion 14 moves to the connection position in a state where the engagement portion 15 is engaged with the engaged portion 16 of the air compressor 1A, the engagement portion 15 is moved downward to apply a force pressing the air compressor 1A downward via the engaged portion 16.

As described above, when the leg portion 9 of the air compressor 1A is placed on the support portion 12 of the auxiliary storage unit 10, the connecting buffer portions 91 of the leg portion 9 of the air compressor 1A come into contact with the connecting support portion 12b of the support portion 12 of the auxiliary storage unit 10. Accordingly, the lever portion 14 moves to the connection position, and a force pressing the air compressor 1A downward is applied via the engagement portion 15 and the engaged portion 16, so that the connecting buffer portions 91, each of which is an elastic body, are elastically deformed in a direction of being crushed. Accordingly, due to a reaction force of the connecting buffer portions 91, a force in a direction opposite to the direction in which the engagement between the engaged portion 16 and the engagement portion 15 is released is applied to the engaged portion 16 and the engagement portion 15 supported by the lever portion 14 of the air compressor 1A, and the engagement between the engaged portion 16 and the engagement portion 15 is prevented from being released.

Further, the leg portion 9 and the support portion 12 are respectively fixed to the tanks by welding, and an error may occur in attachment positions, but due to elastic deformation in the direction in which the connecting buffer portions 91 are crushed between the leg portion 9 and the support portion 12, the connecting buffer portions 91 are reliably in contact with the connecting support portion 12b of the support portion 12, and the error in the attachment positions of the leg portion 9 and the support portion 12 may be absorbed.

Further, the connecting buffer portions 91 are pressed against the connecting support portion 12b due to the reaction force of the connecting buffer portions 91, occurrence of backlash between the air compressor 1A and the auxiliary storage unit 10 is prevented, and the position of the air compressor 1A with respect to the auxiliary storage unit 10 is constantly stabilized.

When the lever portion 14 moves to the connection position, the shaft 15a of the engagement portion 15 and the shaft 14a of the lever portion 14 are aligned in the vertical direction. Accordingly, even when a force that attempts to move the engagement portion 15 upward is applied via the engaged portion 16 by lifting the air compressor 1A, for example, generation of a force to rotate the lever portion 14 around the shaft 14a in a direction that moves the lever portion 14 from the connection position to the release position is prevented.

Further, when the lever portion 14 moved to the connection position attempts to move to the release position in a state where the holding portion 17 moves to the restriction position and the function projection portion 17b protrudes to the movement path of the lever portion 14, the lever portion 14 comes into contact with the restriction portion 17d of the function projection portion 17b. The restriction portion 17d has a shape that prevents generation of a force in a direction of moving the holding portion 17 from the restriction position to the retreat position when the lever portion 14 that attempts to move from the connection position to the release position comes into contact with the restriction portion 17d. Accordingly, when the lever portion 14 that attempts to move from the connection position to the release position comes into contact with the holding portion 17, the holding portion 17 does not rotate around the shaft 17a in the direction that moves the holding portion 17 from the restriction position to the retreat position, and a state where the function projection portion 17b protrudes to the movement path of the lever portion 14 is held. Accordingly, the lever portion 14 is held at the connection position. Accordingly, disengagement of the engagement portion 15 from the engaged portion 16 due to that the lever portion 14 is unintentionally moved from the connection position to the release position may be prevented.

When the auxiliary storage unit 10 is detached from the air compressor 1A, the connection pipe of the air compressor 1A is detached from the pipe of the auxiliary storage unit 10. When the operation portion 17c is operated, the holding portion 17 moves to the retreat position due to the rotation operation around the shaft 17a. Accordingly, the function projection portion 17b is retracted from the movement path of the lever portion 14, and the lever portion 14 may be moved from the connection position to the release position.

The lever portion 14 moves from the connection position to the release position due to the rotation operation around the shaft 14a by operating the operation portion 14b. When the lever portion 14 moves to the release position, the shaft 15a of the engagement portion 15 moves upward due to the rotation operation of the lever portion 14 around the shaft 14a, and the engagement portion 15 is disengaged from the engaged portion 16 of the air compressor 1A. Accordingly, the lever portion 14 may be moved from the connection position to the release position and the engagement portion 15 may be disengaged from the engaged portion 16 without using a tool such as a driver. Then, the air compressor 1A may be lifted and removed from the auxiliary storage unit 10.

What is claimed is:

1. A gas compressor comprising:
a compression unit configured to compress gas;
a drive unit configured to drive the compression unit;
a storage part configured to store the gas compressed by the compression unit;
a main body portion having the compression unit, the drive unit, and the storage part;
a leg portion configured to support the main body portion at an installation place and configured to be supported by a support portion provided on an auxiliary storage unit, the auxiliary storage unit including an auxiliary storage part for storing the gas compressed by the compression unit and configured to supply the gas stored in the auxiliary storage part to the storage part; and
a fastening unit configured to detachably fasten the auxiliary storage unit and the main body portion,
wherein the leg portion includes a grounding buffer portion configured to be brought into contact with the installation place, and a connecting buffer portion configured to be brought into contact with the support portion,
wherein the grounding buffer portion is compressed in a vertical direction by the main body portion when the auxiliary storage unit and the main body portion are not fastened, and wherein a force in the vertical direction is applied to the connecting buffer portion by the support portion when the auxiliary storage unit and the main body portion are fastened so that the connecting buffer portion is elastically deformed and the grounding buffer portion enters an escape portion.

2. The gas compressor according to claim 1, wherein in a state where the leg portion is supported by the support portion, the connecting buffer portion is in contact with the support portion.

3. The gas compressor according to claim 1, wherein in a state where the leg portion is supported by the support portion, only the connecting buffer portion is in contact with the support portion.

4. The gas compressor according to claim 1, wherein in a state where the leg portion is supported by the support portion, the connecting buffer portion and the grounding buffer portion are in contact with the support portion, and an amount of elastic deformation of the connecting buffer portion is larger than an amount of elastic deformation of the grounding buffer portion.

5. The gas compressor according to claim 1, wherein the escape portion is formed in the support portion, and in a state where the grounding buffer portion enters the escape portion, the connecting buffer portion is in contact with the support portion.

6. The gas compressor according to claim 1, wherein the connecting buffer portion surrounds the grounding buffer portion.

7. The gas compressor according to claim 1, wherein the grounding buffer portion has a cylindrical shape.

8. The gas compressor according to claim 1, wherein the connecting buffer portion is disposed around the grounding buffer portion.

9. The gas compressor according to claim 1, wherein the fastening unit comprises a lever.

10. An auxiliary storage unit comprising:
an auxiliary storage part configured to store gas compressed by a gas compressor;
a support portion configured to support a leg portion of the gas compressor; and
a fastening unit configured to detachably fasten the gas compressor in which the leg portion is supported by the support portion, wherein
the support portion is configured to be brought into contact with a connecting buffer portion of the leg portion,
the leg portion includes a grounding buffer portion, and the connecting buffer portion configured to be brought into contact with the support portion,
the grounding buffer portion is compressed in a vertical direction by the gas compressor when the auxiliary storage unit and the gas compressor are not fastened, and
a force in the vertical direction is applied to the connecting buffer portion by the support portion when the auxiliary storage unit and the gas compressor are fastened so that the connecting buffer portion is elastically deformed and the grounding buffer portion enters an escape portion.

11. The auxiliary storage unit according to claim 10, wherein
the fastening unit includes an operation portion configured to be operated for fastening of the gas compressor and releasing the fastening in a state where the auxiliary storage unit is attached to the gas compressor.

12. The auxiliary storage unit according to claim 10, wherein the fastening unit comprises a lever.

13. A gas compression system comprising:
a gas compressor including:
a main body portion including:
a compression unit configured to compress gas;
a drive unit configured to drive the compression unit; and
a storage part configured to store the gas compressed by the compression unit; and
an auxiliary storage unit including an auxiliary storage part for storing gas compressed by the gas compressor and detachably attached to the gas compressor;
a leg portion configured to support the main body portion at an installation place and configured to be supported by a support portion provided on the auxiliary storage unit, the leg portion including a grounding buffer portion configured to be brought into contact with the installation place; and
a fastening unit configured to detachably fasten the gas compressor and the auxiliary storage unit and including an operation portion to be operated for the fastening and releasing of the fastening in a state where the auxiliary storage unit is attached to the gas compressor, wherein
the leg portion includes a connecting buffer portion configured to be brought into contact with the support portion,
the grounding buffer portion is compressed in a vertical direction by the gas compressor when the auxiliary storage unit and the gas compressor are not fastened, and
a force in the vertical direction is applied to the connecting buffer portion by the support portion when the auxiliary storage unit and the gas compressor are fastened so that the connecting buffer portion is elastically deformed and the grounding buffer portion enters an escape portion.

14. The gas compression system according to claim 13, wherein
in a state where the leg portion is supported by the support portion, the connecting buffer portion is in contact with the support portion.

15. The gas compression system according to claim 13, wherein
in a state where the leg portion is supported by the support portion, only the connecting buffer portion is in contact with the support portion.

16. The gas compression system according to claim 13, wherein
in a case where the leg portion is supported by the support portion, the connecting buffer portion and the grounding buffer portion are in contact with the support portion, and an amount of elastic deformation of the connecting buffer portion is larger than an amount of elastic deformation of the grounding buffer portion.

17. The gas compression system according to claim 13, wherein
the support portion includes the escape portion for the grounding buffer portion to enter, and
in a state where the grounding buffer portion enters the escape portion, the connecting buffer portion is in contact with the support portion.

18. The gas compression system according to claim 13, wherein the fastening unit comprises a lever.

* * * * *